(12) United States Patent
Saliba et al.

(10) Patent No.: US 7,149,050 B2
(45) Date of Patent: *Dec. 12, 2006

(54) DIFFRACTIVE POSITION SENSORS AND CONTROL SYSTEMS

(75) Inventors: George A. Saliba, Northborough, MA (US); Leo Cappabianca, Worcester, MA (US)

(73) Assignee: Quantum Corporation, San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/927,732

(22) Filed: Aug. 27, 2004

(65) Prior Publication Data

US 2005/0088776 A1   Apr. 28, 2005

Related U.S. Application Data

(60) Provisional application No. 60/513,169, filed on Oct. 20, 2003.

(51) Int. Cl.
*G11B 5/584* (2006.01)

(52) U.S. Cl. .............................. 360/77.12; 250/559.36

(58) Field of Classification Search ...................... None
See application file for complete search history.

(56) References Cited

U.S. PATENT DOCUMENTS

| | | | |
|---|---|---|---|
| 2,937,239 A | 5/1960 | Walker et al. |
| 3,829,895 A | 8/1974 | Tanaka et al. |
| 3,919,697 A | 11/1975 | Walker |
| 3,971,002 A | 7/1976 | Bricot et al. |
| 4,056,830 A | 11/1977 | Smith |
| 4,110,799 A | 8/1978 | Bergmans et al. |
| 4,149,204 A | 4/1979 | Marino et al. |
| 4,176,381 A | 11/1979 | de Niet et al. |
| 4,321,634 A | 3/1982 | Lehureau |
| 4,334,252 A | 6/1982 | Toriu |
| 4,392,163 A | 7/1983 | Rijckaert et al. |
| 4,422,112 A | 12/1983 | Tanaka |
| 4,424,541 A | 1/1984 | Koinuma et al. |
| 4,439,793 A | 3/1984 | Nater |
| 4,449,082 A | 5/1984 | Webster |
| 4,472,750 A | 9/1984 | Klumpp et al. |
| 4,479,156 A | 10/1984 | Kumagai et al. |
| 4,502,082 A | 2/1985 | Ragle et al. |

(Continued)

FOREIGN PATENT DOCUMENTS

EP    0 854 471 A1    7/1998

(Continued)

OTHER PUBLICATIONS

European Search Report mailed on Mar. 4, 2005 for EP patent application No. 04256391.6, 4 pages.

*Primary Examiner*—Andrew L. Sniezek
(74) *Attorney, Agent, or Firm*—Morrison & Foerster LLP

(57) ABSTRACT

According to one aspect, systems and methods are provided for detecting the relative position of a transducer head with respect to a storage medium utilizing optically diffractive media. In one example, a head positioning servo system includes a transducer head assembly, a diffractive medium spatially fixed with respect to the transducer head assembly, a light source for illuminating at least a portion of a magnetic storage medium and the diffractive medium, a detector for detecting light from the light source illuminating the magnetic storage medium and the diffractive medium, and a controller for adjusting the position of the transducer head with respect to the magnetic storage medium in response to the detected light.

20 Claims, 6 Drawing Sheets

U.S. PATENT DOCUMENTS

| | | |
|---|---|---|
| 4,539,615 A | 9/1985 | Arai et al. |
| 4,679,104 A | 7/1987 | Dahlerud |
| 4,685,005 A | 8/1987 | Fields, Jr. |
| 4,802,030 A | 1/1989 | Henry et al. |
| 4,816,939 A * | 3/1989 | Ford et al. ............... 360/77.03 |
| 4,866,548 A | 9/1989 | Rudi |
| 4,975,791 A | 12/1990 | Eggebeen |
| 4,979,051 A | 12/1990 | Eggebeen |
| 5,050,017 A | 9/1991 | Carr et al. |
| 5,055,959 A | 10/1991 | Saliba |
| 5,072,319 A | 12/1991 | Kohri et al. |
| 5,121,270 A | 6/1992 | Alcudia et al. |
| 5,126,895 A | 6/1992 | Yasuda et al. |
| 5,132,861 A | 7/1992 | Behr et al. |
| 5,257,148 A | 10/1993 | Solhjell et al. |
| 5,262,908 A | 11/1993 | Iwamatsu et al. |
| 5,285,331 A | 2/1994 | White |
| 5,289,328 A | 2/1994 | Saliba |
| 5,294,803 A | 3/1994 | Pahr |
| 5,371,638 A | 12/1994 | Saliba |
| 5,426,551 A | 6/1995 | Saliba |
| 5,448,430 A | 9/1995 | Bailey et al. |
| 5,452,152 A | 9/1995 | Rudi |
| 5,488,519 A | 1/1996 | Ishida et al. |
| 5,523,904 A | 6/1996 | Saliba |
| 5,563,868 A | 10/1996 | Farnsworth et al. |
| 5,588,007 A | 12/1996 | Ma |
| 5,600,500 A | 2/1997 | Madsen et al. |
| 5,600,505 A | 2/1997 | Ayres |
| 5,617,269 A | 4/1997 | Gordenker et al. |
| 5,757,575 A | 5/1998 | Hallamesek et al. |
| 5,796,537 A | 8/1998 | Goker et al. |
| 5,815,337 A | 9/1998 | Milo |
| 5,844,814 A | 12/1998 | Chliwnyj et al. |
| 5,847,892 A | 12/1998 | Goker |
| 5,862,014 A | 1/1999 | Nute |
| 5,940,238 A | 8/1999 | Nayak et al. |
| 5,949,604 A | 9/1999 | Saliba |
| 5,973,872 A | 10/1999 | Saliba |
| 5,973,874 A | 10/1999 | Panish et al. |
| 5,978,188 A | 11/1999 | Kaaden et al. |
| 5,982,711 A | 11/1999 | Knowles et al. |
| 6,005,737 A | 12/1999 | Connolly et al. |
| 6,018,434 A | 1/2000 | Saliba |
| 6,061,199 A | 5/2000 | Goker et al. |
| 6,075,678 A | 6/2000 | Saliba |
| 6,084,740 A | 7/2000 | Leonhardt et al. |
| 6,088,184 A | 7/2000 | Hu |
| 6,108,159 A | 8/2000 | Nute et al. |
| 6,118,605 A | 9/2000 | Call et al. |
| 6,128,155 A | 10/2000 | Sugawara et al. |
| 6,130,792 A | 10/2000 | Goker |
| 6,134,072 A | 10/2000 | Zweighaft |
| 6,141,174 A | 10/2000 | Judge et al. |
| 6,188,532 B1 | 2/2001 | Albrecht et al. |
| 6,222,698 B1 | 4/2001 | Barndt et al. |
| 6,236,529 B1 | 5/2001 | Leonhardt et al. |
| 6,246,535 B1 | 6/2001 | Saliba et al. |
| 6,275,349 B1 | 8/2001 | Smith |
| 6,275,350 B1 | 8/2001 | Barndt |
| 6,285,519 B1 | 9/2001 | Goker |
| 6,307,718 B1 | 10/2001 | Kasetty |
| 6,331,920 B1 | 12/2001 | Albrecht et al. |
| 6,339,522 B1 | 1/2002 | Hoelsaeter |
| 6,366,422 B1 | 4/2002 | Daniel et al. |
| 6,433,951 B1 | 8/2002 | Lubratt |
| 6,493,174 B1 | 12/2002 | Stubbs |
| 6,512,651 B1 | 1/2003 | Eifert et al. |
| 6,545,837 B1 | 4/2003 | Tran |
| 6,570,731 B1 | 5/2003 | Burke et al. |
| 6,700,729 B1 | 3/2004 | Beck et al. |
| 6,768,608 B1 | 7/2004 | Saliba et al. |
| 6,775,092 B1 | 8/2004 | Zweighaft et al. |
| 6,801,383 B1 | 10/2004 | Zweighaft et al. |
| 6,839,196 B1 | 1/2005 | Trivedi |
| 2002/0021524 A1 | 2/2002 | Saliba et al. |
| 2002/0176200 A1 | 11/2002 | Trivedi |
| 2003/0043498 A1 | 3/2003 | Johnson et al. |
| 2004/0042115 A1 | 3/2004 | Saliba et al. |
| 2005/0083600 A1 | 4/2005 | Mahnad et al. |
| 2005/0083601 A1 | 4/2005 | Mahnad et al. |
| 2005/0083602 A1 | 4/2005 | Saliba et al. |
| 2005/0088770 A1 | 4/2005 | Saliba et al. |
| 2005/0094308 A1 | 5/2005 | Mahnad et al. |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |

* cited by examiner

DIFFRACTIVE POSITION SENSORS AND CONTROL SYSTEMS

CROSS REFERENCE TO RELATED APPLICATION

The present application claims benefit of earlier filed provisional patent application, U.S. application Ser. No. 60/513,169, filed on Oct. 20, 2003, and entitled "Diffractive Position Sensors and Control Systems," which is hereby incorporated by reference as if fully set forth herein.

BACKGROUND

1. Field of the Invention

The invention relates generally to magnetic tape storage devices and systems, and more particularly to methods and systems for head positioning servo systems for detecting misalignment between a read/write head and a magnetic storage tape.

2. Description of the Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and data tracks can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, and the like. Other systems may intersperse or embed servo information with user data. These examples, however, reduce data capacity of the tape by using a portion of the tape capacity for servo information.

BRIEF SUMMARY

According to one aspect of the present invention optical servo systems and accompanying methods are provided for acquiring relative position information of a read/write head to a storage tape utilizing optically diffractive media.

In one example, a method is provided for detecting the position of a transducer head with respect to a storage medium. The method includes determining a relative position of a first diffractive medium with respect to a second diffractive medium, wherein the first diffractive medium is associated with the storage medium. The transducer head is repositioned relative to the storage medium in response to the relative position of the first diffractive medium and the second diffractive medium. The first diffractive medium may be included with the storage medium or include an edge of the storage medium, e.g., an edge of a magnetic storage tape. The second diffractive medium may be coupled to the transducer head.

In another example, a head positioning servo system is provided. The exemplary system includes a transducer head assembly, a diffractive medium spatially fixed with respect to the transducer head assembly, a light source for illuminating at least a portion of a magnetic storage medium and the diffractive medium, a detector for detecting light from the light source illuminating the magnetic storage medium and the diffraction medium, and a controller for adjusting the position of the transducer head in response to the detected light.

The servo systems and methods described herein may be employed in a tape drive system to calibrate or servo a recording head with respect to a recording tape. A suitable controller may determine the relative position of the head to the tape, thereby allowing the controller to adjust the head position to achieve a desired position with respect to the tape.

The present invention and its various embodiments are better understood upon consideration of the detailed description below in conjunction with the accompanying drawings and claims.

DETAILED DESCRIPTION

Figure 2:
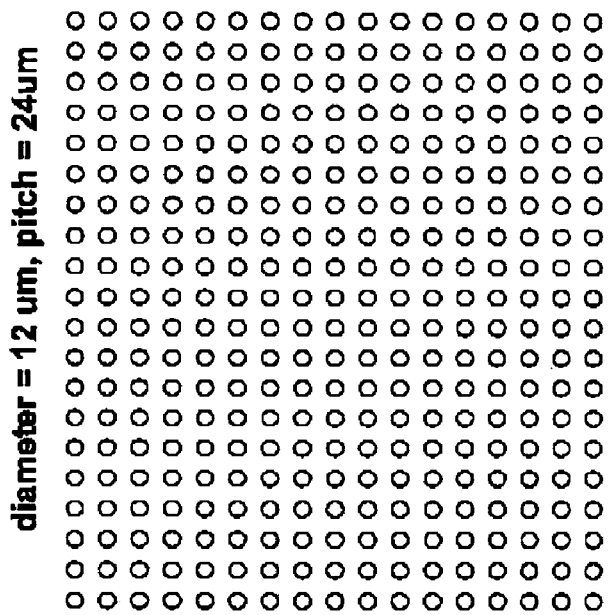
FIG. 2 illustrates an exemplary pattern of an object and/or reference mask.

Various methods and systems for providing calibration and/or position information for a servo system, e.g., a primary servo system or subsystem servo system, are provided. The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a magnetic storage tape in a tape drive system during writing and reading processes is one of the main challenges in the area of magnetic storage tape systems. Generally, a closed loop servo system, deployed by the tape drive electromechanical system, utilizes an estimate of the head's position relative to the storage tape to align the transducer head to a data track position. Exemplary methods and systems described below gather positional information for the relative positioning of transducer elements to the magnetic storage tape by utilizing two diffractive mediums, a first associated with the position of the storage medium and a second associated with the position of the transducer elements. Exemplary methods and systems described may be used without writing magnetic or optical servo data. Additionally, exemplary methods and systems using diffractive media may allow for recording data tracks with reduced width and increased positioning, resulting in increased storage capacity and reduced error rates. Those of ordinary skill in the art, however, will recognize that the exemplary methods and systems may be used to enhance or assist various other servo systems, e.g., magnetic or optical servo systems.

Exemplary tape drive systems and methods that may be used with the various exemplary systems and methods described, include, for example, those described in U.S. Pat. Nos. 6,246,535, 6,108,159, and 5,371,638, and U.S. patent application Ser. No. 09/865,215, all of which are hereby incorporated by reference as if fully set forth herein. Those of ordinary skill in the art will recognize that various other suitable tape drive systems and servo systems (perhaps with some modification that will be apparent to those of ordinary skill in the art) may also be used with one or more of the exemplary systems and methods.

According to one exemplary optical servo method provided herein, the position of a first diffractive medium relative to a second diffractive medium is determined, where the first diffractive medium is associated with the magnetic storage medium. At least one light source (e.g., a coherent source such as a laser) illuminates the first diffractive medium to produce a first diffractive pattern. The first diffractive pattern illuminates the second diffractive medium to produce an output diffraction pattern. At least one detector detects the output pattern. A controller determines a relative position of the first diffractive medium to the second diffractive medium based on the detected output pattern. The controller may determine the relative position of the first diffractive medium to the second diffractive medium in a first (e.g., lateral) direction based upon the detected output pattern (e.g., the total intensity of the detected output pattern).

The exemplary method may be applied to any measurement or positioning system using a material that can be patterned to allow light transmission. The material is fabricated with the pattern attached to or made part of the object to be measured. The resulting diffractive medium may be referred to as an "object mask." A second diffractive medium or "reference mask" may comprise an identical or similar pattern.

The first and second diffractive media may comprise a first and second mask having respective first and second mask patterns. The mask patterns may each comprise a grid of transmissive dots, oblong holes, or similar marks, for example. The mask patterns may be identical. In another example, one mask pattern may comprise an integer multiple number of rows of marks for every row in the other mask pattern, wherein a row lies in a plane of the mask in a longitudinal direction perpendicular to the lateral direction. In another example, the pattern of the first and/or second mask may comprise lines lying in the longitudinal direction.

The at least one detector may include first and second detectors, wherein the second detector is spatially displaced in the lateral direction with respect to the first detector so as to detect the output pattern in a manner offset by 90 degrees from the first detector. For example, if the first detector is laterally aligned with a row of voids, the second detector may be laterally displaced to detect half of the light from the voids. In another embodiment, the first and second detectors may be only partially orthogonally displaced from each other, such as by 120 degrees, for example, which would still include the orthogonal component. By virtue of this orthogonality, the controller may also determine the direction of motion of the second diffractive medium relative to first diffractive medium.

The servo system described herein may be employed in a tape drive to servo a recording head with respect to a recording tape. In such a tape servo system, the first diffractive medium may comprise the recording tape. The recording tape may act as a first mask having servo tracks or other markings as a first mask pattern. A second mask may be mechanically coupled to the recording head. The controller controls the lateral position of the head through a head actuator. The controller determines the relative position of the head to the tape, thereby allowing the controller to adjust the head position to achieve a desired position with respect to the tape.

One advantage of employing interference masks (e.g., with the reference mask mounted to a recording head) is that it does not require a moving optical sensor, thereby simplifying the optical system for tapes and reducing the actuator mass (increasing mechanical responsiveness). Also, this example allows the use of very opaque transmissive media and interference amplification and light aggregation with self-aligning patterns.

Figure 1:
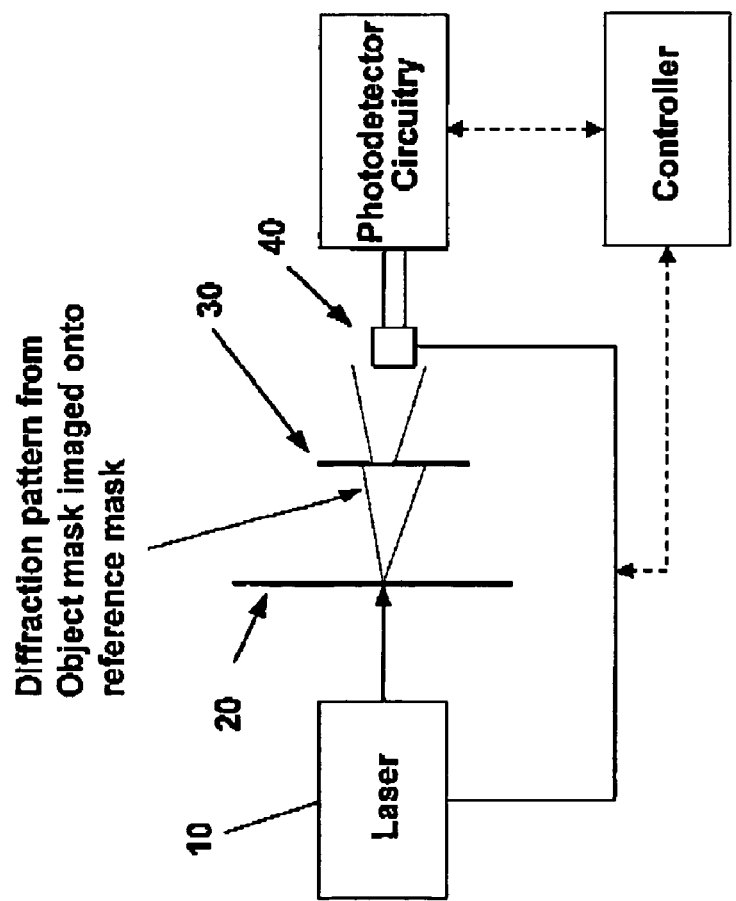
FIG. 1 illustrates an exemplary optical servo system.
Figure 3:
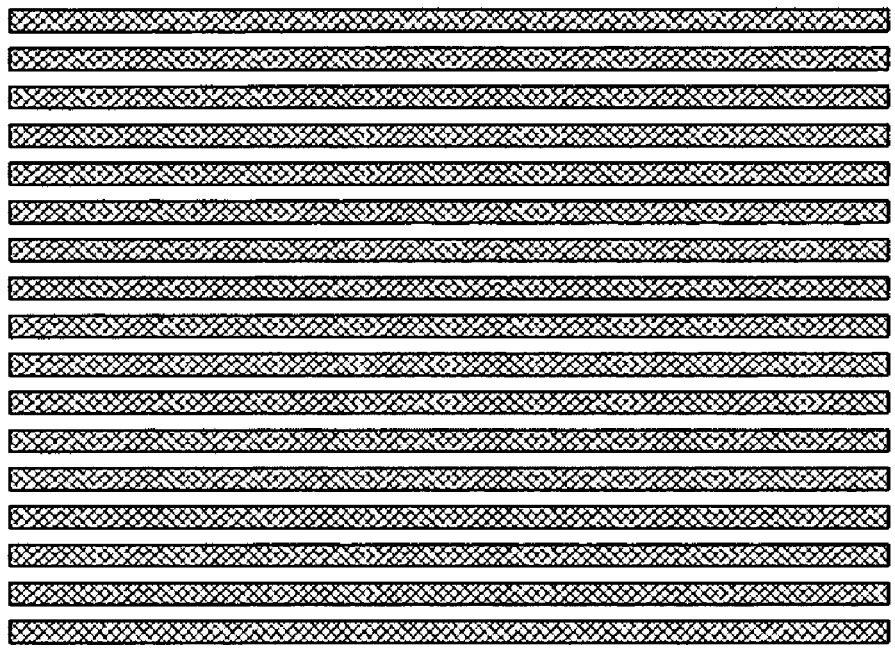
FIG. 3 illustrates an exemplary pattern of an object and/or reference mask.

FIG. 1 illustrates an exemplary optical servo system according to one example. This example is described and shown for detecting object motion in one dimension, however, those skilled in the art will recognize that the techniques described herein may be expanded to multiple dimensions. In this example, the motion of interest is in the vertical direction (i.e., lateral direction perpendicular to the longitudinal direction of the tape transport). Two masks are used, an object mask 20 associated with a storage medium and a reference mask 30, as shown in FIG. 1. In one example, object mask 20 is attached or included with the object, e.g., storage tape, and the reference mask 30 is held in a stationary position. A light source 10, such as a coherent laser source, illuminates object mask 20 and reference mask 30. A sensor 40, e.g., a CMOS or CCD photodetector array, is used to measure the light energy that passes through object mask 20 and reference mask 30. The light source 10, sensor 40, and reference mask 30 are mechanically fixed relative to the object and associated object mask 20. The mask patterns may include, for example, a circular grid pattern, as shown in FIG. 2, or a line pattern, as shown in FIG. 3. The dimensions of the mask pattern relate to the measurement resolution, e.g., generally, smaller dimensions of the mask pattern marks result in finer measurement resolution. In one example, the diameter of the marks, e.g., as shown in FIG. 2, is 12 μm and the pitch is 24 μm. Those of ordinary skill in the art will recognize that various other mask patterns are possible.

Sensor 40 measures the total diffracted light energy that passes through both object mask 20 and reference mask 30, which contains information concerning both the position of object mask 20 and reference mask 30. For example, maximum intensity of the detected light occurs when the pattern of object mask 20 is aligned to the pattern of reference mask 30. As the object mask 20 is moved vertically (laterally) there is an increasing, then decreasing, intensity change corresponding to each row crossing of the object mask 20 diffracted pattern with the reference mask 30 pattern. Provided the object mask 20 and reference mask 30 patterns are properly aligned, maximum light intensity occurs when there is an object mask 20 row coincident with a reference mask 30 row. The maximum intensity row crossing occurs when the object mask 20 pattern is directly over the reference mask 30 pattern.

Quadrature waveforms, e.g., sine and cosine waveforms, can be used to keep row count and direction. For example, by using two sensor systems, offset in phase by 90 degrees, sine and cosine signals may be produced.

Further enhancements to this system will be recognized by those of ordinary skill in the art. For example, imaging optics placed between object mask 20 and reference mask 30 may optimize the object mask diffraction pattern imaged onto the reference mask 30. Light collimation and light collecting lenses can also be used to improve the amount of light collected by sensor 40.

According to another exemplary method and system, a tape drive detects servo information by employing a double mask interference technique as described above and includes a mask pattern attached to a recording head of the system. A servo pattern disposed on the magnetic tape provides the second diffractive mask pattern. In one example, the magnetic tape may be that used by the SDLT drive manufactured by Quantum Corporation or any other suitable storage tape, and the optical diffraction servo system may be used with current SDLT LTM reduction systems. The exemplary methods and systems provide a measure of head motion relative to the tape mask position.

In one example, the reference mask pattern may be designed to allow maximum light transmission. The mask material is fabricated with an optical pattern and attached to or made part of the head assembly. The mask pattern diffraction interference produces an amplified pattern that is used to detect and, ultimately, control the tape motion, and position, of the object mask relative to the reference mask. This example may reduce or eliminate the need for reflective optical sensors in conventional tape drive systems without requiring modification of the tape media. Additionally, compared to existing reflective optical servo systems, this example may also simplify the optical system by removing the optical sensor from the head actuator, thereby reducing actuator mass and increasing mechanical responsiveness.

Figure 4:
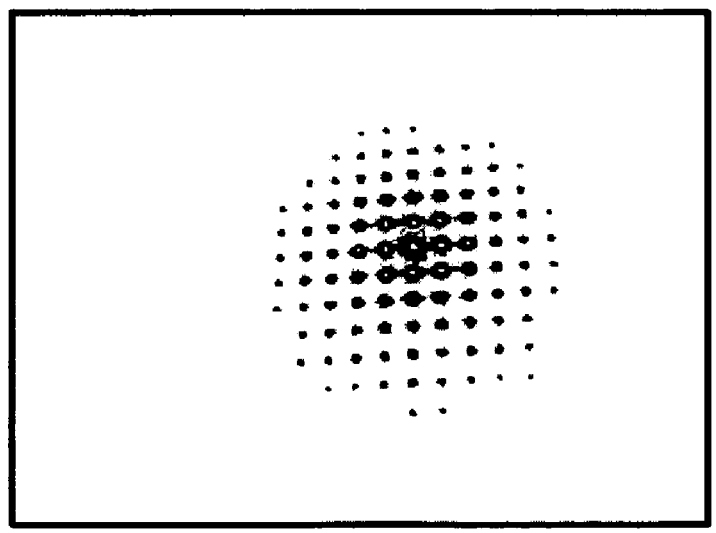
FIG. 4 illustrates an exemplary optical mask diffraction pattern.
Figure 5:
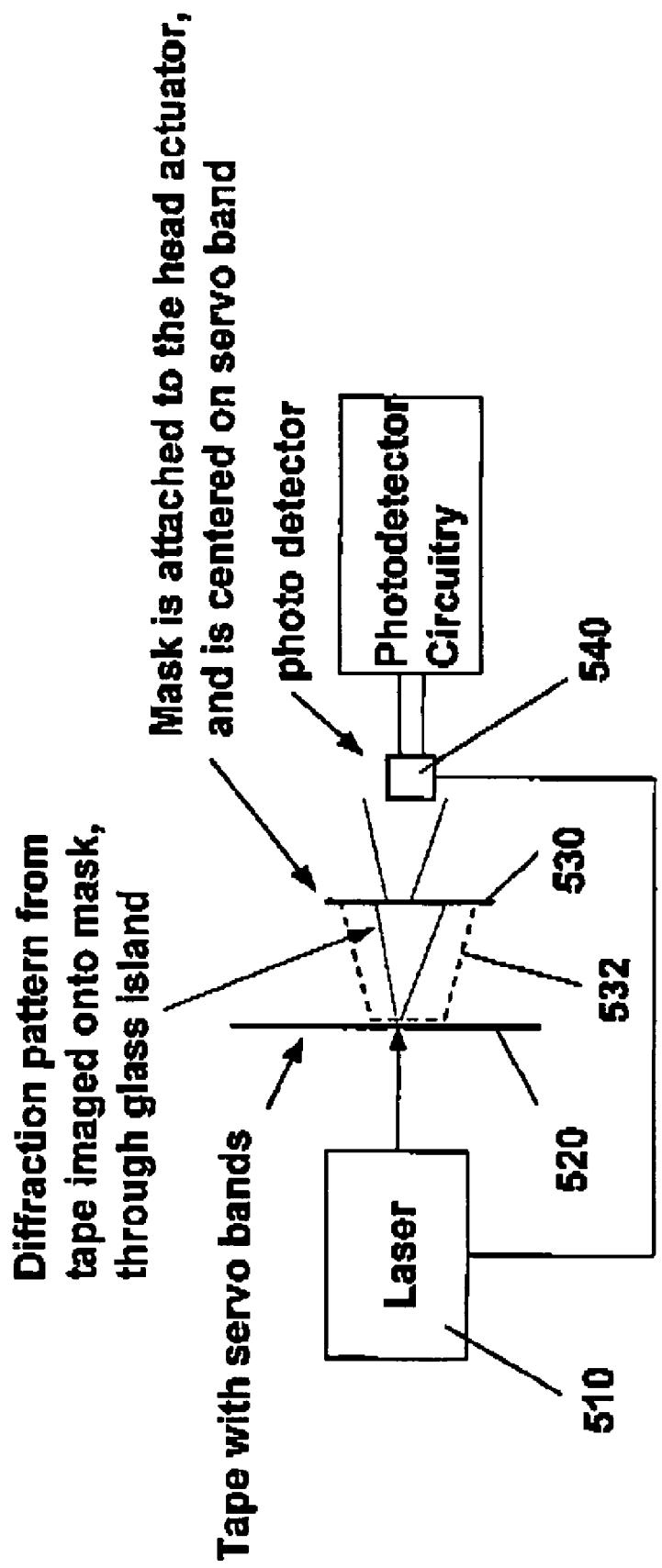
FIG. 5 illustrates an exemplary optical servo system.

Referring to FIG. 5, an exemplary optical servo system using a magnetic tape servo pattern and a mask pattern attached to the head actuator to detect head motion is described. The magnetic tape servo pattern and the mask pattern geometry may be similar to that shown in FIG. 2. Operation of the method is similar to that described with reference to FIG. 1. A light source 510, e.g., a laser of coherent light, illuminates and transmits through a servo pattern attached to or made part of the magnetic tape 520, thereby creating a diffraction pattern similar to that shown in FIG. 4. The diffraction pattern is then imaged onto a reference mask or actuator mask 530 coupled to or part of a recording head. The total light energy passing through the actuator mask 530 is the sum of the light passing through the servo pattern of tape 520 and actuator mask 530. A sensor 540, e.g., a CMOS or CCD photodetector array, measures the total diffracted light energy that passes through actuator mask 530, which contains information concerning both the tape position and the actuator position.

Figure 6:
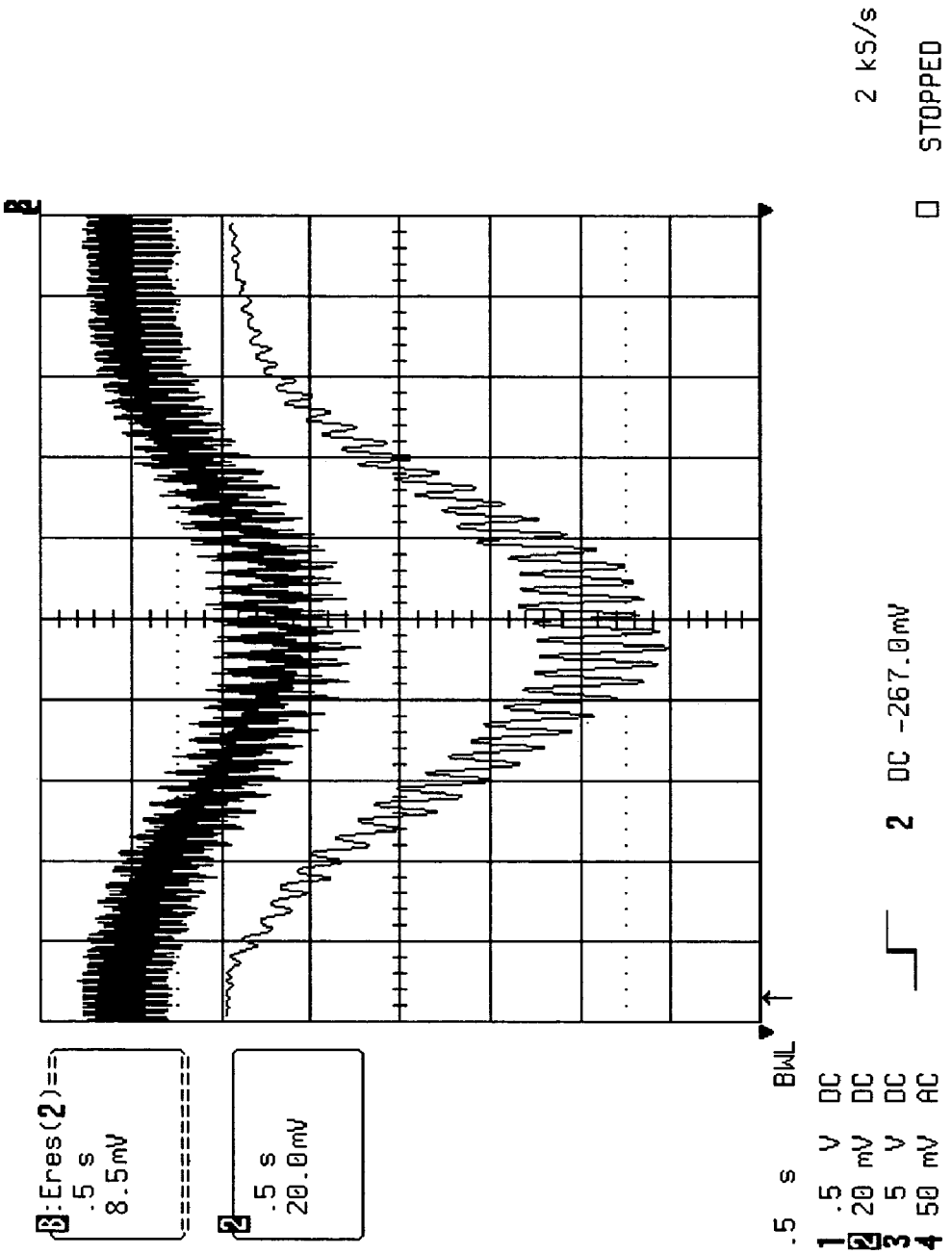
FIG. 6 illustrates exemplary signals detected by an optical sensor in an optical servo system.

When light transmits through the tape 520 servo pattern, a diffraction pattern is projected and imaged onto the mask 530. Movement of mask 530 or light source 510 does not shift the diffraction pattern; however, there is an intensity change, as measured by sensor 540, when the tape 520 servo pattern moves laterally. The diffraction pattern created by the light source 510 transmitting through the servo pattern interferes with the diffraction pattern created by this light as it transmits through the actuator mask 530 pattern. Maximum intensity occurs when the servo pattern of tape 520 is centered on the mask 530 pattern, as shown in FIG. 6. As the mask 530 is moved laterally there are two effects observed: a slowly increasing, then decreasing, intensity change; and a faster sinusoidal intensity change corresponding to each track crossing of the tape diffracted pattern with the mask pattern.

Provided mask 530 and tape 520 servo patterns are properly aligned, there will be only one maximum light intensity track crossing at the band center, specifically at track 9 (assuming 17 tracks in a servo band). This maximum intensity track crossing occurs when the tape servo pattern is directly over the mask pattern. This easily detectable signal is the reference point from which tracks can be counted. There will be 8 tracks above this point and 8 tracks below this point, resulting in the 17 tracks of the servo band. The oscilloscope trace of FIG. 20 shows the signal obtained when the entire 17 tracks of the mask move transversely over the magnetic tape diffraction pattern.

Two servo signals are advantageously used for counting tracks and to determine direction. Quadrature waveforms, e.g., sine and cosine waveforms, can be used to keep track count and direction. For example, using two patterns offset in phase by 90 degrees produces sine and cosine signals. In this example, assuming a track pitch of 0.00100 inch, the relative transverse mask displacement will be 0.00025 inch. Using two masks with two photodetectors placed in quadrature will provide sine and cosine signals whose count will determine track number, with the difference determining direction. Additionally, various imaging optics placed between the mask and the tape may optimize the tape diffraction pattern imaged onto the mask as will be recognized by those of ordinary skill in the art.

In another example, the mask 530 may be incorporated into a glass tape island 532 in contact with tape 520 to smooth out any minor tape edge anomalies. The mask can be placed onto the glass by etching away a deposited metal layer, or by direct bonding of photographic mask, for example. The glass island may be placed near the recording head.

The above observations describe how the mask position sensor works with a static magnetic tape. With the magnetic tape in motion, there is another component to the detected signals. The tape servo mark motion acts as a carrier and the tape lateral motion modulates this carrier. As will be apparent to those skilled in the art, subsequent signal processing techniques may be employed to detect the amount of modulation corresponding to the amount of lateral tape motion.

This method (and others described herein) enables optical transmission through standard recording tape, which is practically opaque. The light is amplified orders of magnitude through a matching selection of mask, wavelength and interference "nth" order aggregation/detection. The resultant optical system demonstrates the feasibility of a reduced actuator mass by moving the laser and detectors off of the actuator. In one example, the mask is the only element attached to the actuator. The actuator mass reduction increases servo response compared to prior art optical servoing techniques. This method and system are also more tolerant of missing or deformed servo marks, since the method and system integrate many servo marks simultaneously to produce position information.

According to another example, the edge of the magnetic tape creates a diffraction pattern that is imaged onto a mask. The resulting interference pattern contains direction and relative motion information that is detected with a suitable sensor and used for servo positioning a head actuator. Thus, in one exemplary optical servo method and system, a first diffractive medium includes an edge of the recording tape. The geometry of the servo system (e.g., the distance between the tape edge and the second diffractive medium and the distance between the second diffractive medium and the at least one detector) can be adjusted to control the phase difference between two orders of fringes in the output pattern (e.g., the (0,0) and (0,−1) orders). For example, the phase difference can be set to 90 degrees, or to a partially orthogonal value such as 120 degrees. A first detector may detect one order and a second detector may detect the other order. By virtue of detection of these quadrature signals, the controller is provided with information concerning the direction of motion of the second diffractive medium with respect to the tape edge.

Figure 7:
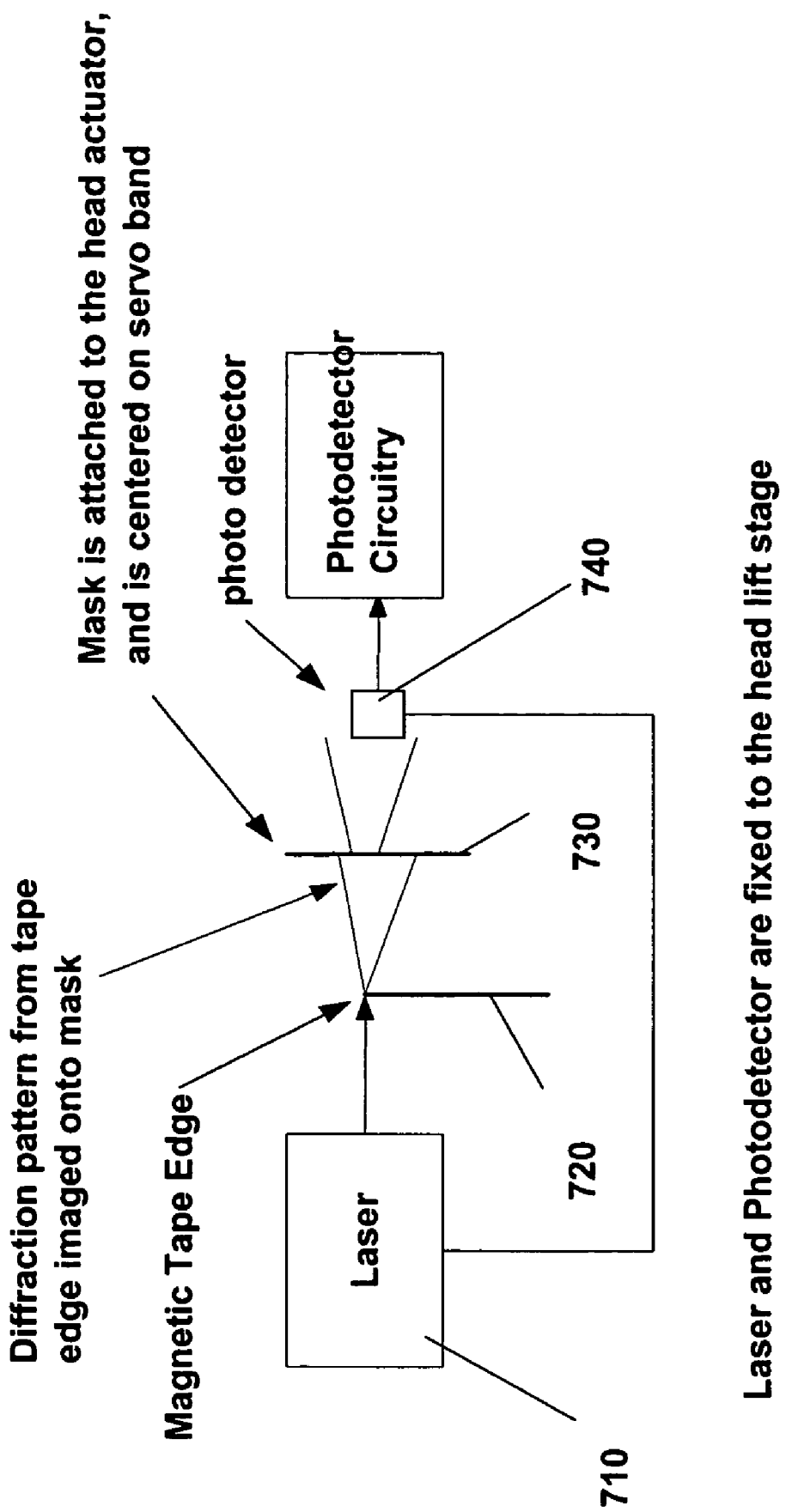
FIG. 7 illustrates an exemplary optical servo system.

FIG. 7 illustrates an exemplary optical servo system where an optical source 710 illuminates an edge of a storage tape 720 to create a diffraction pattern to provide servo information. Operation of the exemplary servo system may be described by following the light path from left to right in FIG. 7. Light source 710, e.g., a laser, provides illumination that diffracts over tape edge 720, creating a diffraction pattern, which is imaged onto and passes through mask 730 creating an output mask diffraction pattern. The output diffraction pattern is detected by sensor 740 and may be processed to provide relative positional information of tape 720 within the system.

In one example, light source 710 includes a coherent light source, e.g., a laser diode or the like. Sensor 740 may include any suitable optical sensor array or line scanner such as a CCD or CMOS device. Light source 710, sensor 740, and mask 730 may be mechanically fixed in a known physical relationship relative to tape 720 and a head actuator (not shown).

In one example, mask pattern 730 includes four bands of optical marks (e.g., holes or transmissive portions), one of which is illustrates in FIG. 2. In one example, the mask includes a hole pattern having a pitch of 24 μm and a diameter of 12 μm. It will be recognized that various other dimensions and mask patterns may be used, e.g., another mask pattern that may be used includes lines in the longitudinal direction with suitable spacing and dimensions to provide direction and relative motion information. The pattern on mask 730 may be one dimensional, comprising elements such as lines with suitable width and spacing, or a grating line pattern for increased light transmission. Additionally, a mask may include a pattern of varying transmissive materials to the light source.

When light diffracts over the edge of tape 720 and a diffraction pattern is projected and imaged onto the actuator mask 730, movement of mask 730 or light source 710 does not shift the diffraction pattern; rather, the movement creates an intensity change in the diffraction pattern, as measured by sensor(s) 740. Maximum intensity occurs when the tape edge diffraction pattern covers or matches the actuator mask 730 pattern. As mask 730 is moved laterally with respect to the edge of tape 720 two effects are observed: a slowly increasing intensity change; and a faster sinusoidal intensity change corresponding to each track crossing of the tape edge diffracted pattern with the actuator mask diffraction pattern.

Figure 8:
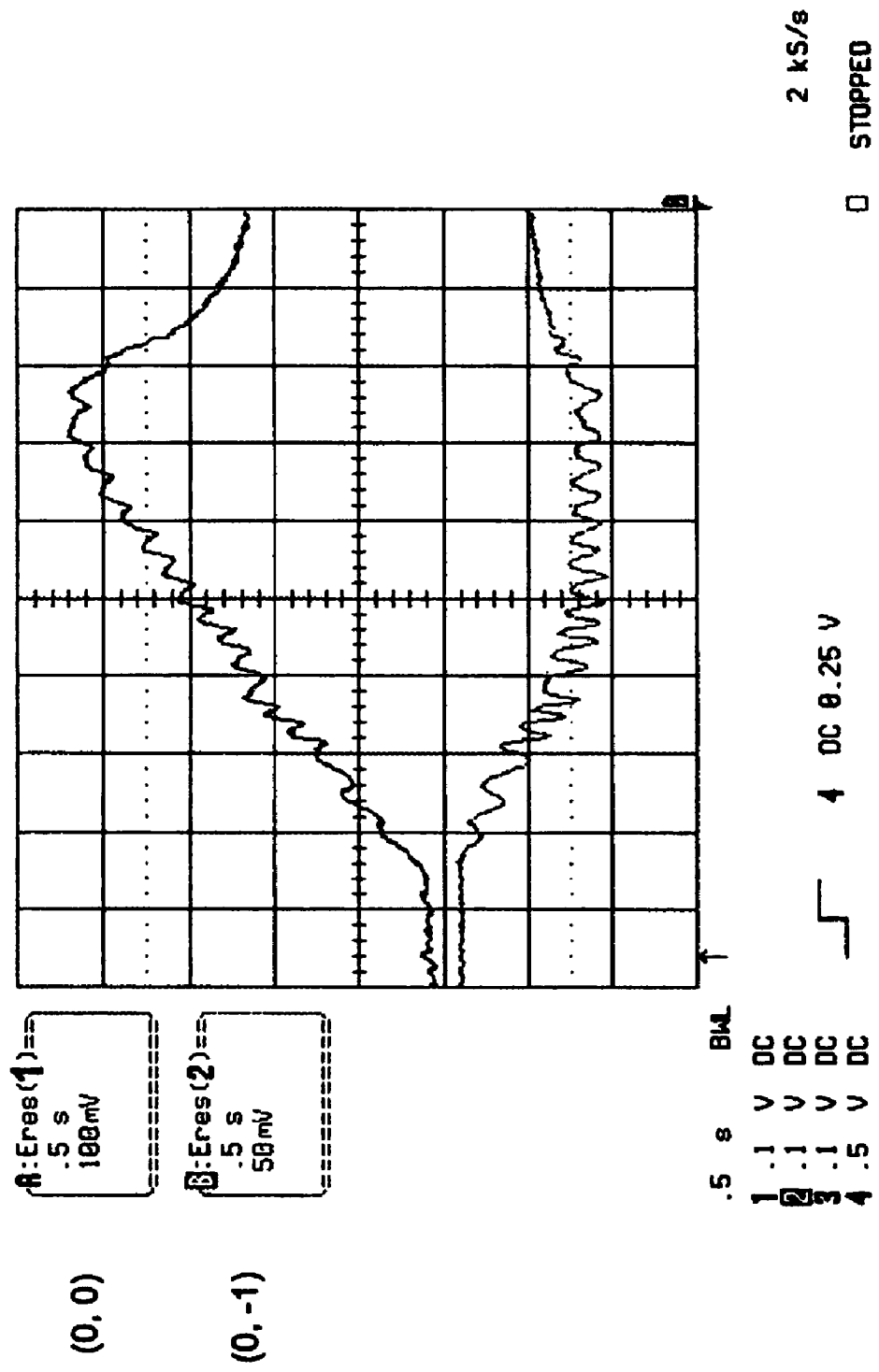
FIG. 8 illustrates exemplary signals detected by an optical sensor in an optical servo system.

From the output mask diffraction pattern, two of the orders (0, 0) and (0, −1) provide light levels that are out of phase with each other as a function of tape 720 or mask 730 lateral motion. The geometry of the system, e.g., the distance from the edge of tape 720 to mask 730, and the distance from mask 730 to sensor 740, may be adjusted to provide varying amounts of phase difference between the two orders (0, 0) and (0, −1). In one example, the phase difference of the servo system is 90 degrees out of phase, e.g., as is the case with sine and cosine waveforms. Using two waveforms that are 90 degrees out of phase it will be recognized that both relative position and direction of motion of tape 720 to the transducer head may be derived. In one example, two photodetectors, one for each order of the diffraction pattern, allow the signals to be detected simultaneously. FIG. 8 illustrates scope traces displaying two orders in one example.

Provided mask 730 and the edge of tape 720 are properly aligned, there will be a single maximum light intensity track crossing. This maximum intensity track crossing occurs when the tape edge diffraction pattern is matched over the mask pattern. This signal is the reference point from which tracks can be determined. In the exemplary scope trace shown in FIG. 8, the maximum intensity track occurs on track 17.

It should be recognized by those of ordinary skill in the art that the exemplary servo methods for sensing the position of a tape edge are illustrative only and various modifications (including additions and subtractions of devices or actions) to the above methods and systems are possible. Additionally, various methods and systems may be used in combination with other optical tape edge servo methods and systems.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A head positioning servo system, comprising:
   a transducer head assembly;
   a diffractive medium spatially fixed with respect to the transducer head assembly;
   a light source for illuminating an edge of a magnetic storage medium and the diffractive medium;
   a detector for detecting light from the light source illuminating the edge of the magnetic storage medium and the diffractive medium; and
   a controller for adjusting the position of the transducer head assembly with respect to the magnetic storage medium in response to the detected light, wherein the controller determines the relative position of the transducer head assembly to the magnetic storage medium based on an output pattern of the light illuminating the edge of the magnetic storage medium and passing through the diffractive medium.

2. The system of claim 1, wherein the magnetic storage medium includes a second diffractive medium.

3. The system of claim 1, wherein the light source is configured to illuminate the edge of the magnetic storage medium to create a diffraction pattern imaged onto the diffractive medium.

4. The system of claim 1, wherein the diffractive medium includes a grid of optical marks.

5. The system of claim 1, wherein the diffractive medium includes a row of optical marks.

6. The system of claim 1, wherein the diffractive medium is included with a glass tape head island configured to be in contact with a magnetic storage medium.

7. The system of claim 1, wherein the detector includes a first detector and a second detector displaced laterally across the width of the storage medium.

8. A transducer head assembly, comprising:
   a head support structure supporting at least one transducer element;
   a diffractive medium spatially fixed with respect to the at least one transducer element;
   a light source for illuminating an edge of a magnetic storage medium and the diffractive medium; and
   a detector for detecting light from the light source illuminating the edge of the magnetic storage medium and the diffractive medium, wherein the controller determines the relative position of the transducer head assembly to the storage medium based on an output pattern of the light illuminating the edge of the magnetic storage medium and passing through the diffractive medium.

9. The head assembly of claim 8, further comprising a controller for adjusting the position of the transducer head with respect to the magnetic storage medium in response to the detected light.

10. The head assembly of claim 8, wherein the magnetic storage medium includes a second diffractive medium.

11. The head assembly of claim 8, wherein the light source is operable to illuminate the edge of the magnetic storage medium to create a diffraction pattern imaged onto the diffractive medium.

12. The head assembly of claim 8, wherein the diffractive medium includes a grid of optical marks.

13. The head assembly of claim 8, wherein the diffractive medium includes a row of optical marks.

14. The head assembly of claim 8, wherein the diffractive medium is included with a glass tape head island configured to be in contact with a magnetic storage medium.

15. The head assembly of claim 8, wherein the detector includes a first detector and a second detector displaced laterally across the tape width.

16. A method for detecting the position of a transducer head with respect to a storage medium, comprising:
   determining a relative position of a first diffractive medium with respect to an edge of a storage medium;
   repositioning the transducer head relative to the storage medium in response to the relative position of the first diffractive medium with respect to the edge of the storage medium; and
   determining the relative position of the first diffractive medium and the edge of the storage medium based on an output pattern of light diffracting from the edge of the storage medium and passing through the first diffractive medium.

17. The method of claim 16, further comprising illuminating the first diffractive medium and the edge of the storage medium with a light source, and detecting light passing both the first diffractive medium and the edge of the storage medium.

18. The method of claim 16, wherein the first diffractive medium is mechanically coupled with the transducer head.

19. The method of claim 16, wherein the first diffractive medium includes a grid of optical marks.

20. The method of claim 16, wherein the first diffractive medium includes a row of optical marks.

* * * * *